United States Patent
Kijak et al.

(10) Patent No.: US 7,852,414 B2
(45) Date of Patent: Dec. 14, 2010

(54) METHOD OF SELECTING SEEDS FOR THE CLUSTERING OF KEY-FRAMES

(75) Inventors: Ewa Kijak, Ercé près Liffré (FR); Lionel Oisel, La Nouaye (FR); Bertrand Chupeau, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1421 days.

(21) Appl. No.: 10/532,282

(22) PCT Filed: Oct. 27, 2003

(86) PCT No.: PCT/FR03/03203

§ 371 (c)(1),
(2), (4) Date: Oct. 4, 2005

(87) PCT Pub. No.: WO2004/040472

PCT Pub. Date: May 13, 2004

(65) Prior Publication Data

US 2006/0146199 A1    Jul. 6, 2006

(30) Foreign Application Priority Data

Oct. 28, 2002    (FR) .................................. 02 13978

(51) Int. Cl.
*G06K 9/00* (2006.01)
*H04N 5/14* (2006.01)
*H04N 9/64* (2006.01)

(52) U.S. Cl. .......................... 348/700; 715/723; 382/181

(58) Field of Classification Search ......... 382/224–225, 382/181, 170; 704/245; 348/700; 715/723; 383/181
See application file for complete search history.

(56) References Cited

U.S. PATENT DOCUMENTS 6,774,917 B1 *    8/2004    Foote .......................... 345/700

OTHER PUBLICATIONS

Paul E. Green: "Analyzing Multivariate Data", The Dryden Press, 1978, ISBN 0-03-020786-x.*

(Continued)

*Primary Examiner*—Andy S Rao
*Assistant Examiner*—Hee-Yong Kim
(74) *Attorney, Agent, or Firm*—Robert D. Shedd; Paul P. Kiel; Guy H. Eriksen

(57) ABSTRACT

The method is characterized in that it implements the following steps:
  random drawing of p candidates from the set of key images,
  calculation of a cost C for each candidate,
  selection of the candidate minimizing the cost C,
  determination of a subset from among the set of key images such that the key images forming the said subset have a distance from the candidate less than a threshold T,
  determination of a seed from among the key images of the subset such that it minimizes the cost function C for this subset,
  deletion of the key images of the subset to form a new set of key images for at least one new random draw and determination of a new seed according to the previous 5 steps.

The field is that of the selection of shots of interest in a video sequence.

8 Claims, 3 Drawing Sheets

OTHER PUBLICATIONS

Paul S. Bradley et al.:"Refining Initial Points for K-Means Clustering",Microsoft Research Technical Report 1998,pp. 3-4).*

Palmer:"Density Biased Sampling:An Improved Method for Data Mining and CLustering",Processing of ACM SIGMOD International Conference on Management of Data,2000.*

Turi et al.:"K-Means Clustering for Colour Image Segmentaion with Deteftion of K", Proceedings of the LASTED international Conference Signal and Image Processing, Oct. 1998,pp. 345-349.*

Wan et al.:"A multiresolution color clustering approach to image indexing and retrieval",Proceedings of 1998 IEEE International Conference,pp. 3705-3708.*

J.M. Pena et al: An empirical comparison of four initialization methods for the K-Means algorithm', Pattern Recognition Letters 20(1999) 1027-1040.*

Khan et al:"Cluster center initialization algorithm for K-means clustering", Pattern Recognition Letters 25 (2004) 1293-1302.*

Ji He et al:"Initialization of Cluster Refinement Algorithms: A Review and Comparative Study", Proceedings of Int'l Conference on Neural Networks, Jul. 2004 vol. 1, pp. 297-302.*

Douglas Steinley:"Initializing K-means Batch Clustering: A Critical Evaluation of Several Techniques",Journal of Classification vol. 24:pp. 99-121, 2007.*

Vailaya et al: "Video Clustering" Technical Report MSU-CPS-96-64, Nov. 1996, Department of Computer Science, Michigan State University, MI, US, pp. 1-8.

K.J. Jain et al: "Algorithms for Clustering Data" Algorithms for Clustering Data, 1988, pp. 96-101.

A. Hanjalic et al: "An Integrated Scheme for Automated Video Abstraction Based on Unsupervised Cluster—Validity Analysis" IEEE Transactions on Circuits and Systems for Video Technology, IEEE, Inc., vol. 9, No. 8, Dec. 1999, pp. 1280-1289.

Ng et al: "Efficient and Effective Clustering Methods for Spatial Data Mining", 20th International Conference on Very Large Data Bases, Sep. 12-15, 1994.

Search Report Dated Apr. 21,2004.

* cited by examiner ures, then the candidate shots
METHOD OF SELECTING SEEDS FOR THE CLUSTERING OF KEY-FRAMES This application claims the benefit, under 35 U.S.C. §365 of International Application PCT/FR03/03203, filed Oct. 27, 2003, which was published in accordance with PCT Article 21(2) on May 13, 2004 in French and which claims the benefit of French patent application No. 0213978, filed Oct. 28, 2002.

The invention relates to a method of selecting seeds for the grouping of key images of a video sequence as well as to the method of grouping. It also relates to a method of automatic extraction of shots of interest in a video sequence.

BACKGROUND OF THE INVENTION

The field is that of index construction for intra-video interactive navigation or that of video structuring, that is to say the ordering of the shots which makes it possible to define a table of contents.

A video sequence is composed of shots, each shot corresponding to picture breaks, which may themselves be grouped into scenes. Structuring involves a step of classifying the shots. The latter step is of course possible only on condition that the content of the video can be structured, for example in fields such as sport, televised news, interviews, etc.

Usually, the classes are defined beforehand by supervised or unsupervised learning procedures, then the candidate shots of a video are attached to one of the classes, on the basis of a similarity measure.

The classification of the shots is a fundamental step of the video structuring process. Numerous procedures for classifying and representing shots are proposed, but few concern themselves with the identification of these classes.

For example, in a video summary creation context, the article by S. Uchihashi, J. Foote, A. Girgensohn, J. Boreczsky entitled "Vidéo Manga: Generating Semantically Meaningful Video Summaries", Proc. ACM Multimedia, Orlando, Fla., pp 383-392, November 1999, describes a hierarchical grouping procedure within the step of structuring the sequence. The result is represented in the form of a tree. On initialization, each image of the video is assigned to a class or cluster. Then similar images are grouped together by iteratively merging the two closest structures at each step. At the root, one finds the maximum cluster containing the set of images. Henceforth the desired number of clusters is selected by specifying the distance of the merged clusters from their parent. By this procedure, similar shots are grouped together, but no information regarding the nature of the shots is found.

On the other hand for the structuring of televised news, as described in the article by H. J Zhang, S. Y. Tan, S. W. Smoliar, G. Yihong entitled "Automatic parsing and indexing of news video", Multimedia Systems, 2(6):256-265, 1995, one seeks to distinguish two types of shots: those concerning the presenter and those relating to reporter footage. The shots of the presenter are identified with the aid of spatial characteristics: typically, a person in the foreground and an inlay in the top right or left. The first step consists in defining a model A of the image representative of a shot of the presenter. In the second step, the shots are labelled as belonging to A or otherwise, with the aid of a measure of similarity using local descriptors, the key image previously being segmented into regions. In this procedure, a shot of interest is modelled first, then all the shots which come close to this model are selected.

Another application of the selection of shots of interest is to identify the shots concerning the interviewee and those of the interviewer in a video of an interview. In this approach, for example described in the article by O. Javed, S. Khan, Z. Rasheed, M. Shah entitled "A Framework for Segmentation of Interview Videos", IASTED Intl. Conf. Internet and Multimedia Systems and Applications, Las Vegas, November, 2000, one is more interested in the information carried by the transitions between shots, coupled with the knowledge of the structure of an interview video, alternate shots of the interviewer and of the interviewee, than in the analysis of the content of the scene. However, a skin detection algorithm is used to determine the number of people in the image. Since the questions are typically shorter than the answers, the assumption used is that the shots of the interviewer are among the shortest. The key images of the N shortest shots containing just one person are correlated to find the most repetitive shot. One thus obtains an N×N correlation matrix whose rows are summed. The key image corresponding to the maximum sum is then identified as the key image of the interviewer. It is again correlated with all the other images to find all the shots concerned therewith.

FIG. 1 represents, in a known manner, a general scheme of the construction of video summaries. In a first step referenced 1, the sequence of images is split into shots, the shots corresponding to picture breaks. For each shot, one or more characteristic images are selected, these being key images. This is the object of step 2. For each key image, a signature is calculated in step 3, using local descriptors or attributes, for example colour, contours, texture, etc. Step 4 performs a selection of shots of interest as a function of these signatures or attributes and a summary is made in step 5 on the basis of these shots of interest.

The nature of the shots of interest varies as a function of the intended application. For example, for televised news, it may involve the presenter. These shots of interest often correspond to the prevalent shots, that is to say to a dominant picture. Specifically, in certain sequences, in particular sports sequences, the most interesting moments are characterized by a common and repetitive picture in the course of the sequence, for example during a football, tennis, baseball match, etc.

The invention is more particularly related to the step of selecting the shots of interest. The procedure proposed is based on the signature of each key image, associated with a metric, so as to determine in a binary manner whether or not the shots belong to the class of shots of interest.

Relating to partitioning or "clustering", numerous algorithms exist. Found to be among the most used is the K-means based on the calculation of the barycentre of the attributes or its variant the K-medoid which takes into account the physical point, that is to say the image closest to the barycentre, which are iterative algorithms. From an initial partition, the K-means or K-medoid group the data together into a fixed number of classes. This grouping is very sensitive to the initial partition. Moreover, it requires the a priori fixing of the number of classes, that is to say a priori knowledge of the content of the video. In the converse case, it does not guarantee the obtaining of an optimal partitioning of the video sequence processed.

SUMMARY OF THE INVENTION

An aim of the invention is to alleviate the aforesaid drawbacks. Its subject is a method of selecting seeds from a set of key images of a video sequence for the grouping of key images of prevalent shots of the video sequence, characterized in that it implements the following steps:

random drawing of p candidates from the set of key images, p being calculated to increase the probability of drawing a key image of a prevalent shot, calculation of the cost C for each candidate, dependent on the distance from the key images of the set to that of the candidate, the distance relating to the signatures, selection of the candidate (k1) minimizing the cost C, determination of a subset (Ik) from among the set of key images such that the key images forming the said subset have a distance from the candidate less than a threshold T, —determination of a seed (k2) from among the key images of the subset (Ik) such that it minimizes the cost function C for this subset, deletion of the key images of the subset (Ik) to form a new set of key images for at least one new random draw and determination of a new seed according to the previous 5 steps.

According to a particular implementation, the random draw is of the Monte-Carlo type, p being calculated by the Monte-Carlo formula.

According to a particular implementation, the key images are weighted, as regards their signature, as a function of the length of the shots of the video sequence that they characterize and the random draw is biased by the weight of the key images.

The invention also relates to a method of grouping (clustering) shots of a sequence of video images, the sequence being split into shots, a shot being represented by one or more key images, at least one signature or attribute being calculated for the key images, comprising a phase of partitioning the key images on the basis of a comparison of the attributes of the key images, characterized in that it comprises a phase of initialization for the selection of at least two key images or seeds on the basis of which the comparisons for the grouping are performed, the selection being performed according to the method of claim 1.

According to a particular implementation, the method is characterized in that the initialization and partitioning phases are iteratively repeated, the key images of the most compact cluster obtained in the previous iteration being eliminated from the set processed at this previous iteration so as to provide a new set on which the new iteration is performed.

The invention also relates to a method of selecting shots of interest, these shots being prevalent in the video sequence, characterized in that it implements the method described above, the shots of interest corresponding to the grouping performed about the first seed selected.

The bigger the number n of seeds picked to initialize the clustering algorithm, the more compact and hence coherent are the clusters in the sense of the metric used. The number n of seeds picked to initialize the algorithm is fixed but the number of classes obtained is not known a priori.

The method allows the identification of the prevalent shots in the sequence. During the first iteration, the first cluster obtained represents these prevalent shots. The subsequent iterations make it possible to refine the classification and to reduce the rate of poor classifications. It is thus possible to retrieve the whole set of shots concerning a prevalent picture so as to eliminate the secondary sequences. Assuming that these prevalent shots are shots of interest, the method makes it possible to automatically extract the shots of interest from the video sequence.

BRIEF DESCRIPTION OF THE DRAWINGS

Other features and advantages of the invention will become clearly apparent in the following description given by way of non-limiting example and offered in conjunction with the appended figures which represent FIG. 1, a general scheme of the construction of video summaries, FIG. 2, an algorithm for selecting seeds, FIG. 3, the result of the clustering on a tennis sequence.

DESCRIPTION OF PREFERRED EMBODIMENTS

The processing algorithm for partitioning the images operates in two successive phases. The first consists in selecting candidate shots for the grouping, this being the algorithm for selecting seeds. The object of the second phase is to assign each shot to one of the groups represented by the seeds, this being the actual algorithm for classifying the shots. The phase of selecting the seeds is based on the assumption of prevalent shots and ensures that during the first iteration of the partitioning algorithm, a shot corresponding to the picture of interest is selected first. Shots belonging to the so-called class of interest are then labelled "shots of interest", the others "shots of non-interest".

The first phase consists in a selection of the representatives of the "interest"/"non-interest" classes.

The assumption on which the selection is based is that the shots belonging to the picture that we are seeking are prevalent in terms of number of images in the set of the sequence. We make the assumption that at least half of the key images representing our shots do indeed correspond to the model sought.

In order to give more significance to lengthy shots and to satisfy the assumption, a coefficient representative of the significance of the shot, in terms of relative length, is attached to each key image, to give greater weight to the prevalent shots. This weighting coefficient is taken into account in the subsequent steps, in particular in the calculations of distance. It would of course be equally conceivable to attach several key images to a shot in proportion to the latter's length. In this case, on account of the more significant volume of data to be processed, the processing time would be increased.

Initialization of the Algorithm

The step of initialization, which itself constitutes the algorithm for selecting seeds, of the partitioning (clustering) algorithm consists in finding seeds for the classification in the space of signatures. The number of images being significant, it is carried out by random drawing of p key images. In order to ensure, under the assumption of prevalent shots of interest, that at least one key image representative of a prevalent shot is drawn, the number p is calculated according to the Monte-Carlo sampling procedure. In this formula, the data contamination rate is biased by the weight of the key images. The Monte-Carlo sampling procedure is known and described for example is the article by P. Meer, D. Mintz, A. Rosenfeld entitled: "*Robust regression methods for computer vision: a review*"—International Journal of Computer Vision, Vol:6, No. 1, P. 59-70 (1991). It is necessary to ensure also that the same draw is never performed twice. Only one key image out of the P images drawn will be picked as seed for the initialization of the clustering algorithm, as indicated hereinbelow.

Figure 1:
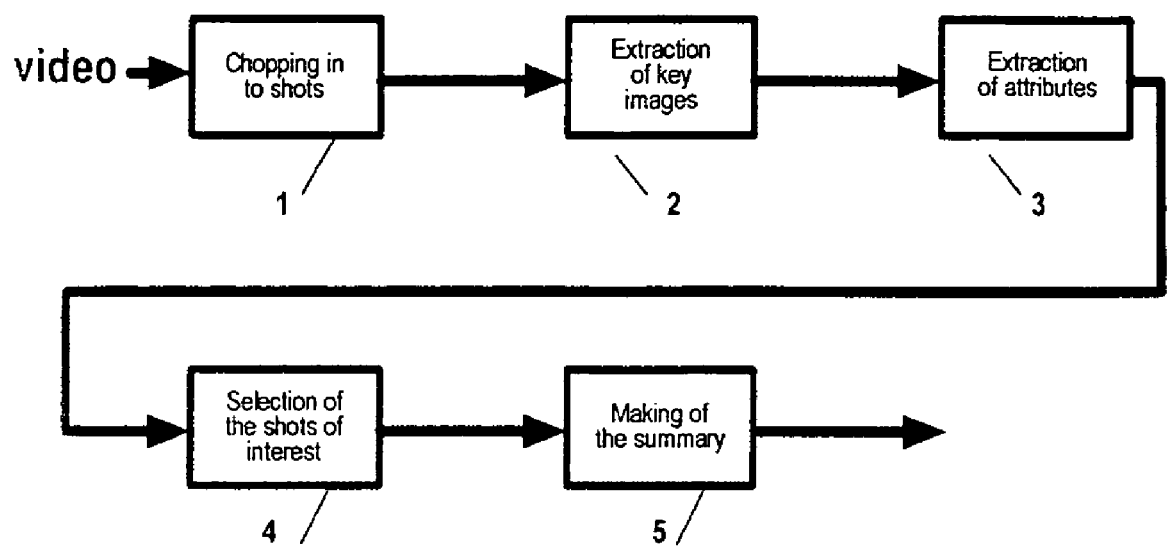
Figure 2:
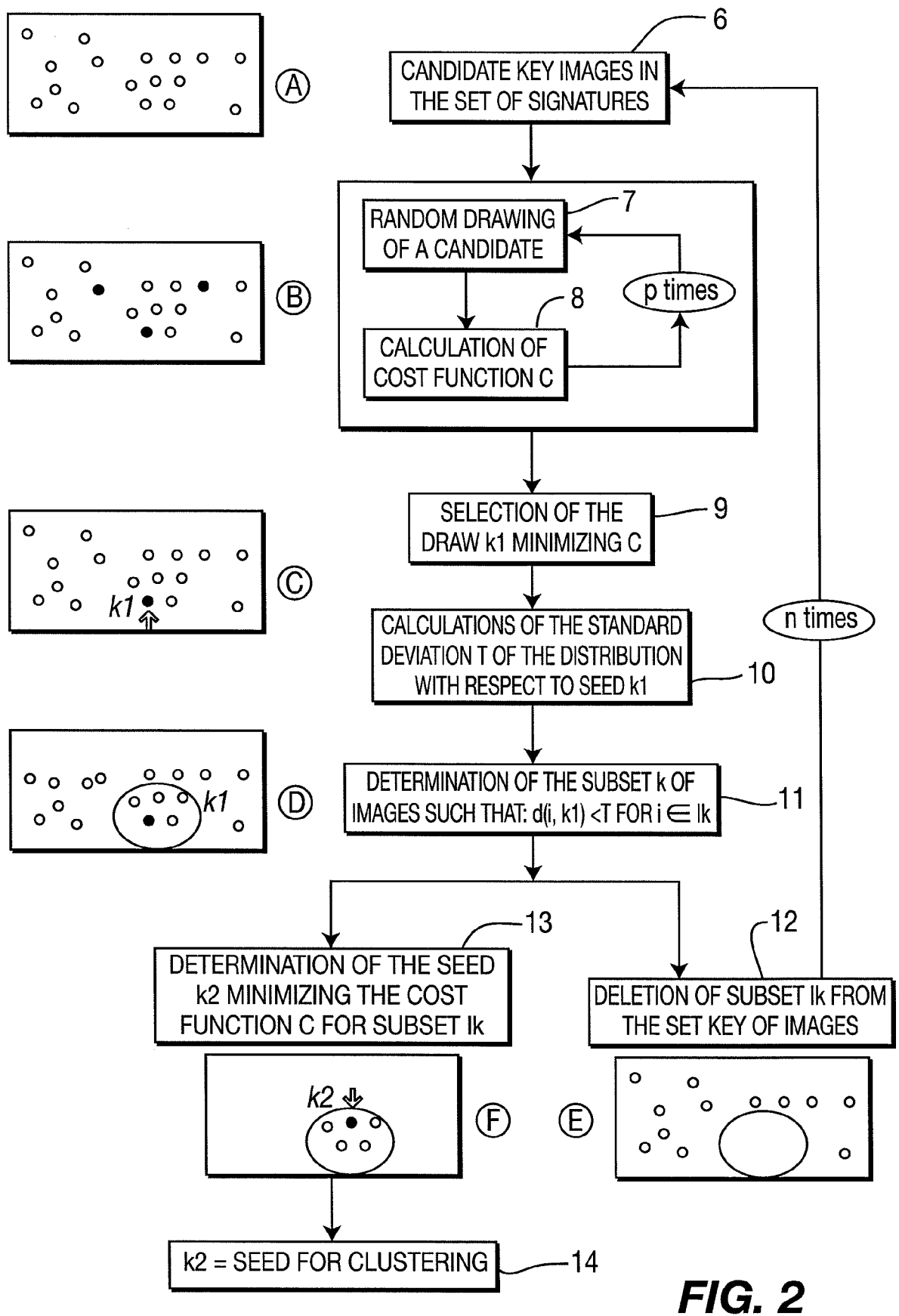

FIG. 2 describes an algorithm for selecting n seeds. The various rectangles referenced A to F represent the set of key images such as it evolves during the processing.

Step 6 groups together the set of candidate key images in the set of signatures. At the outset, that is to say during the first iteration, this is the set of key images of the video sequence processed. This set is represented by the rectangle A. These images are characterized by their signatures, for example the dominant colours which are the components of a multidimensional vector allocated to each image.

The next step 7 performs a random drawing of a candidate according to a Monte-Carlo type numerical sampling procedure. The next step 8 calculates, for the image drawn, its cost.

For example, this cost may be defined by the function:

$$C=\Sigma f(e_i^2) \text{ with:}$$

$e_i$=weighted quadratic distance between the signature picked, that is to say that of the image selected or candidate, and the signature of image i of the set, $$f(e_i^2)=e_i^2 \text{ if } e_i^2 < T^2$$

$$f(e_i^2)=T^2 \text{ if } e_i^2 \geq T^2$$

where T is the standard deviation of the distribution of the weighted distances from the image selected.

Steps 7 and 8 are repeated p times, p being a value calculated by the Monte-Carlo formula. The value p thus corresponds to the minimum draw making it possible to guarantee with a high probability that a key image representing a prevalent shot has been drawn. This probability depends on the rate of contamination, that is to say on the percentage of key images of interest in the set. For example p is of the order of 10 for a probability of 99% and a minimum contamination rate of 50%. Of course, a random draw according to another procedure may be performed in step 7, the number p being related to this probability that at least one key image representing a prevalent shot has been drawn. One therefore obtains p candidates, elements represented in black in the rectangle B. Out of the p candidates to which p costs are allocated, a selection is performed which consists in choosing the candidate k1 corresponding to the lowest cost, this is the object of step 9. Given the assumptions, this candidate corresponds to the key image. This element is designated by an arrow in the rectangle C. Step 10 carries out a calculation of the standard deviation T of the distribution with respect to the candidate k1.

The next step 11 determines, for the draw or candidate k1 picked, the subset Ik of the elements of which the distance from the candidate to the signatures is less than a threshold T. Here this is the standard deviation of the distribution of distances from the candidate but this threshold could equally well be a value fixed a priori. This subset is surrounded in the rectangle D.

The determination of the seed k2, in the subset Ik, to initialize the K-medoid, is performed in the next step 13. This is the element of the subset Ik minimizing the cost function C. It is a local minimum. Step 14 stores this seed k2. This seed is designated by an arrow in the subset Ik represented in the rectangle F.

The iteration is performed by looping back from step 11 to step 6 by way of a step 12. After determination of the subset Ik, step 11, step 12 eliminates from the set of key images, the elements making up this subset. The set of candidate key images is therefore restricted by discarding the elements of the subset Ik, which contains key images that are too close to the seed previously found. The elements of the new set, represented in the rectangle E, are grouped together in step 6 and utilized for a new iteration. The number of iterations, that is to say of seeds selected is fixed at n, n being a predefined value. Step 14 therefore stores n seeds k2.

On account of the assumption, the shots sought being prevalent, the weights of each of the images which represent them are among the most significant. This guarantees that they correspond to the most compact group within the metric sense used. We are then certain that the first seed sought corresponds to a representative of the "interest" class.

The second phase consists in the implementation of the algorithm for partitioning the shots.

The partition or grouping of the shots on the basis of the seeds is performed in a conventional manner by grouping the key images of signatures that are closest to those of the seeds. To each seed found there corresponds a group. Each shot represented by its signature is attributed to the closest seed. If a signature is equidistant from two seeds or too distant from the seeds, it is picked as a new seed and the partitioning of the shots recommences taking account of this new seed.

The shots or key images of the cluster corresponding to the first seed are labelled "interest", the other shots are labelled "non-interest".

This procedure is not robust in the sense that the classification is not optimal, since a shot is compelled to be associated with one of the clusters predetermined by the initialization except in one of the two cases cited above. A particular implementation of the invention consists in carrying out an iteration of the partitioning algorithm making it possible to render the procedure robust.

Once all the shots have been grouped into clusters, the mean and the standard deviation of the distribution of the distances from the seed are calculated for each cluster obtained. Only the most compact cluster is picked. The other clusters are "released", that is to say a new set consisting of these other clusters alone is utilized for the subsequent implementation of the initialization and classification algorithms. The initialization and classification processes are therefore repeated for all the remaining key images. An iteration is therefore performed on the basis of a set obtained by eliminating from the set corresponding to the previous iteration, the most compact cluster found during this previous iteration.

Several criteria for stopping the iterations may be implemented:

a single seed is selected, that is to say the initialization process generates just one seed. The candidate key images processed by the initialization algorithm are sufficiently close together to correspond to the subset Ik and hence to a single seed;

the averages of the intra-cluster distances are almost equal. Stated otherwise, a new iteration of the partitioning algorithm will not afford any extra information;

there no longer remain sufficient key images and unit clusters would be obtained. The candidate key images are very different, generating only subsets Ik of a single image.

The algorithm has been deployed and tested on several tennis sequences.

Figure 3:
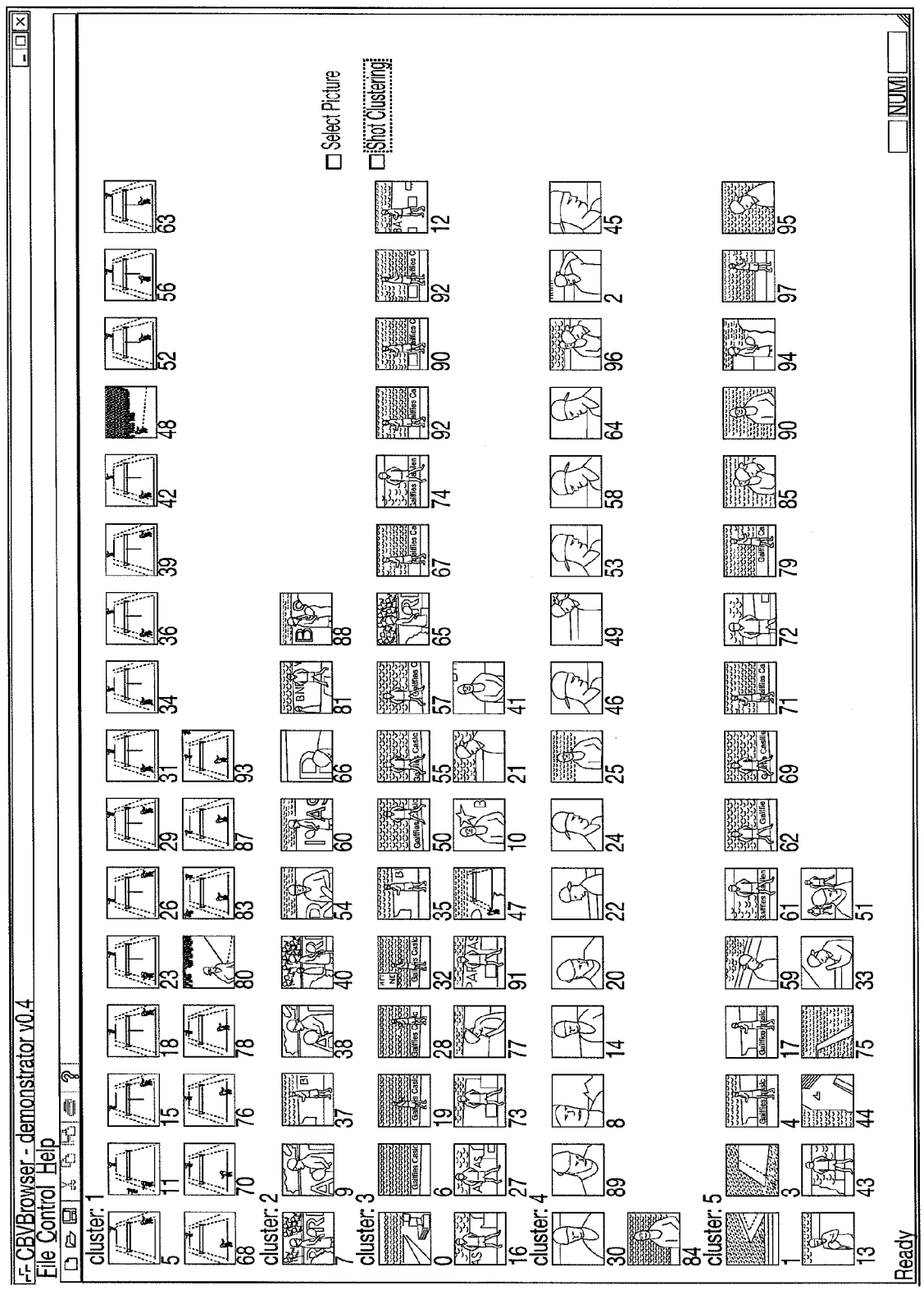

FIG. 3 shows a draftsperson's rendition of the result of the clustering algorithm on a tennis sequence containing 97 shots, with n=3.

Cluster No. 1, at the top of the figure, represents a draftsperson's rendition of the shots of interest. The other clusters contain a draftsperson's rendition of other, different groups of pictures such as close-ups and pictures of the public.

Applications relate for example to the creation of a lengthy summary by concatenating the shots selected. The shots selected may also serve as input to a more complex structuring algorithm that may be based on a priori knowledge of the picture.

In the example described, the signature used is a dominant colours vector associated with a simplified quadratic distance. Other criteria making it possible to characterize the video sequences to be partitioned, for example texture, contours, etc. may be contemplated. These criteria are chosen in such a way as to be able to characterize shots of interest.

The invention claimed is:

1. Method of selecting seeds from a set of key images of a video sequence for the grouping of key images of prevalent shots of the video sequence for use in interactive navigation of the video sequence, comprising the following steps:
   random drawing of p candidates from the set of key images by automatically extracting shots of interest, p being calculated to increase the probability of drawing a key image of a prevalent shot,
   calculation of a cost C for each candidate, dependent on the distance from the key images of the set to that of the candidate, the distance relating to signatures,
   selection of the candidate minimizing the cost C,
   determination of a subset from among the set of key images such that the key images forming the subset have a distance from the candidate less than a threshold T,
   determination of a seed from among the key images of the subset such that it minimizes the cost function C for this subset,
   deletion of the key images of the subset to form a new set of key images for at least one new random draw and determination of a new seed according to the previous 5 steps in order to refine the grouping of key images to those of interest for the interactive navigation of the video sequence,
wherein the cost C is dependent on the quadratic distances between the signature of the candidate and those of the key images of the subset and in that T is the standard deviation of the distribution of the distances of the key images of the set from the candidate and is dependent on the distribution of the distances of the key images of the set from the candidate.

2. Method according to claim 1, wherein the key images are weighted, as regards their signature, as a function of the length of the shots of the video sequence that they characterize and in that the random draw is biased by the weight of the key images.

3. Method according to claim 1, wherein the signature of an image relates to the dominant colour.

4. Method of grouping (clustering) shots of a sequence of video images, the sequence being split into shots, a shot being represented by one or more key images, at least one signature or attribute being calculated for the key images, comprising a phase of partitioning the key images on the basis of a comparison of the attributes of the key images, comprising a phase of initialization for the selection of at least two key images or seeds on the basis of which the comparisons for the grouping are performed, the selection being performed according to the method of claim 1.

5. Method according to claim 4, wherein the partitioning phase implements an algorithm of the K-means or K-medoid type.

6. Method according to claim 4, wherein the initialization and partitioning phases are iteratively repeated, the key images of the most compact cluster obtained in the previous iteration being eliminated from the set processed at this previous iteration so as to provide a new set on which the new iteration is performed.

7. Method according to claim 6, wherein the stopping criterion for the iterations is dependent on the number of key images not belonging to the most compact cluster selected or else is dependent on the averages of the intra-cluster distances.

8. Method of selecting shots of interest, these shots being prevalent in the video sequence, implementing the method according to claim 4, the shots of interest corresponding to the grouping performed about the first seed selected.

* * * * *